(12) United States Patent
Gummaraju et al.

(10) Patent No.: US 10,397,278 B2
(45) Date of Patent: Aug. 27, 2019

(54) TRANSPARENTLY ENHANCED AUTHENTICATION AND AUTHORIZATION BETWEEN NETWORKED SERVICES

(71) Applicant: BanyanOps, Inc., San Francisco, CA (US)

(72) Inventors: Jayanth Gummaraju, San Francisco, CA (US); Tarun Desikan, San Francisco, CA (US); Yoshio Turner, San Francisco, CA (US)

(73) Assignee: BanyanOps, Inc., San Francisco, CA (US)

( * ) Notice: Subject to any disclaimer, the term of this patent is extended or adjusted under 35 U.S.C. 154(b) by 196 days.

(21) Appl. No.: 15/661,926

(22) Filed: Jul. 27, 2017

(65) Prior Publication Data

US 2018/0034858 A1 Feb. 1, 2018

Related U.S. Application Data

(60) Provisional application No. 62/367,486, filed on Jul. 27, 2016.

(51) Int. Cl.
*H04L 29/06* (2006.01)

(52) U.S. Cl.
CPC .......... *H04L 63/20* (2013.01); *H04L 63/0428* (2013.01); *H04L 63/08* (2013.01); *H04L 63/10* (2013.01); *H04L 63/1433* (2013.01)

(58) Field of Classification Search
CPC ..... H04W 12/06; H04W 12/12; H04W 12/00; H04W 12/08; H04W 4/50; H04W 76/10; H04L 63/08; H04L 63/10; H04L 63/20; H04L 63/0807; H04L 63/105; H04L 63/1441; H04L 63/1408; H04L 63/1433; H04L 63/0428; H04L 2463/102; H04L 9/3213; H04L 41/046

See application file for complete search history.

(56) References Cited

U.S. PATENT DOCUMENTS

| | | | |
|---|---|---|---|
| 8,793,782 B1* | 7/2014 | Su | H04L 63/0807 |
| | | | 713/153 |
| 9,130,921 B2* | 9/2015 | Boubez | H04L 63/08 |
| 10,205,666 B2* | 2/2019 | Mittal | H04L 47/215 |
| 2012/0017085 A1* | 1/2012 | Carter | G06F 21/41 |
| | | | 713/168 |
| 2016/0044040 A1* | 2/2016 | Caffary, Jr. | G06F 21/6218 |
| | | | 726/4 |
| 2017/0214683 A1* | 7/2017 | Kroehling | H04L 63/0807 |

* cited by examiner

*Primary Examiner* — Brian F Shaw
(74) *Attorney, Agent, or Firm* — Stinson LLP

(57) ABSTRACT

A control system facilitates communication between a plurality of networked services. The control system includes a client agent associated with a first service of the networked services, and a destination agent associated with a second service of the networked services. The client agent includes an injection mechanism that intercepts a network request issued by the first service, transparently injects a token into the network request while the network request is in transit, and automatically transmits the network request to the second service in accordance with one or more security policies associated with the second service. The destination agent includes an interception mechanism that intercepts the network request, extracts the tokens from the network request, and determines whether to forward the network request to the second service.

20 Claims, 6 Drawing Sheets

TRANSPARENTLY ENHANCED AUTHENTICATION AND AUTHORIZATION BETWEEN NETWORKED SERVICES

CROSS-REFERENCE TO RELATED APPLICATION

This application claims the benefit of U.S. Provisional Application No. 62/367,486, filed Jul. 27, 2016.

BACKGROUND

Known networked services are susceptible to costly security risks such as data breaches, corruption, or service disruption. To prevent or mitigate such security risks, some known network infrastructures include layers of authentication and authorization (AuthNZ) systems to restrict access to protected resources. Deploying and maintaining layers of AuthNZ systems, however, may impose large management burdens on system administrators. Moreover, deploying and maintaining multiple AuthNZ systems increases opportunities to make configuration mistakes that might accidentally open security holes.

Even without any configuration mistakes, known AuthNZ systems leave its protected resources vulnerable to threat vectors such as network spoofing, leakage of long-lived credentials, or host compromise. Some known AuthNZ systems, for example, are deployed and managed individually, with little or no ability for cross-layer coordination. When network firewall rules and password authentication procedures are processed independently, a network firewall employing an "allow rule," for example, may allow a client service presenting leaked credentials (e.g., credentials of another client service) to gain unauthorized access to protected resources on a destination service. Other shortcomings of known AuthNZ systems include the burden they impose on application developers to modify their source code, thereby limiting portability and increasing development and testing costs, and their limited or lack of support for a wide range of application layer protocols, thereby failing to protect services using unsupported protocols.

SUMMARY

Aspects of the disclosure enable one or more authentication and authorization systems to be enhanced in a transparent manner. In one aspect, a computer-implemented method is provided for facilitating communication between a plurality of networked services. The method includes identifying, at a first host system, a first service of the networked services, and deploying, to the first host system, a first agent associated with the first service. The first agent includes one or more identity tokens associated with the first service, and one or more access tokens associated with a second service of the plurality of networked services. A communication transmitted from the first service and directed to the second service is identified at the first agent, and it is determined whether the communication includes a network request. On condition that the communication includes the network request, the identity tokens are transparently injected into the communication for use in authenticating and authorizing the first service, and the communication is automatically transmitted to the second service in accordance with one or more security policies associated with the access tokens.

In another aspect, a system is provided for facilitating communication between a plurality of networked services. The system includes a client agent associated with a first service of the networked services, and a destination agent associated with a second service of the networked services. The client agent includes an injection mechanism configured to intercept a network request issued by the first service for the second service, and transparently inject one or more identity tokens into the network request while the network request is in transit to the second service and automatically transmit the network request to the second service in accordance with one or more security policies associated with the second service. The destination agent includes an interception mechanism configured to intercept the network request issued by the first service, extract the identity tokens from the network request, determine whether the identity tokens satisfy one or more predetermined security thresholds, and, on condition that the predetermined security thresholds are satisfied, forward the network request to the second service.

In yet another aspect, a computing system is provided for facilitating communication between a plurality of networked services. The computing system includes a memory device storing data associated with at least a first service of the networked services and computer-executable instructions, and a processor configured to execute the computer-executable instructions. When executed by the processor, the computer-executable instructions enable the computing system to identify the first service, generate, for transmission to a controller, a registration request associated with the identified first service for use in registering the first service with the controller, receive, from the controller, one or more identity tokens associated with the first service and one or more access tokens associated with a second service of the networked services, identify a communication transmitted from the first service and directed to the second service, determine whether the communication includes a network request, and, on condition that the communication includes the network request, transparently inject the identity tokens into the communication for use in authenticating and authorizing the first service, and automatically transmitting the communication to the second service in accordance with one or more security policies associated with the one or more access tokens.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
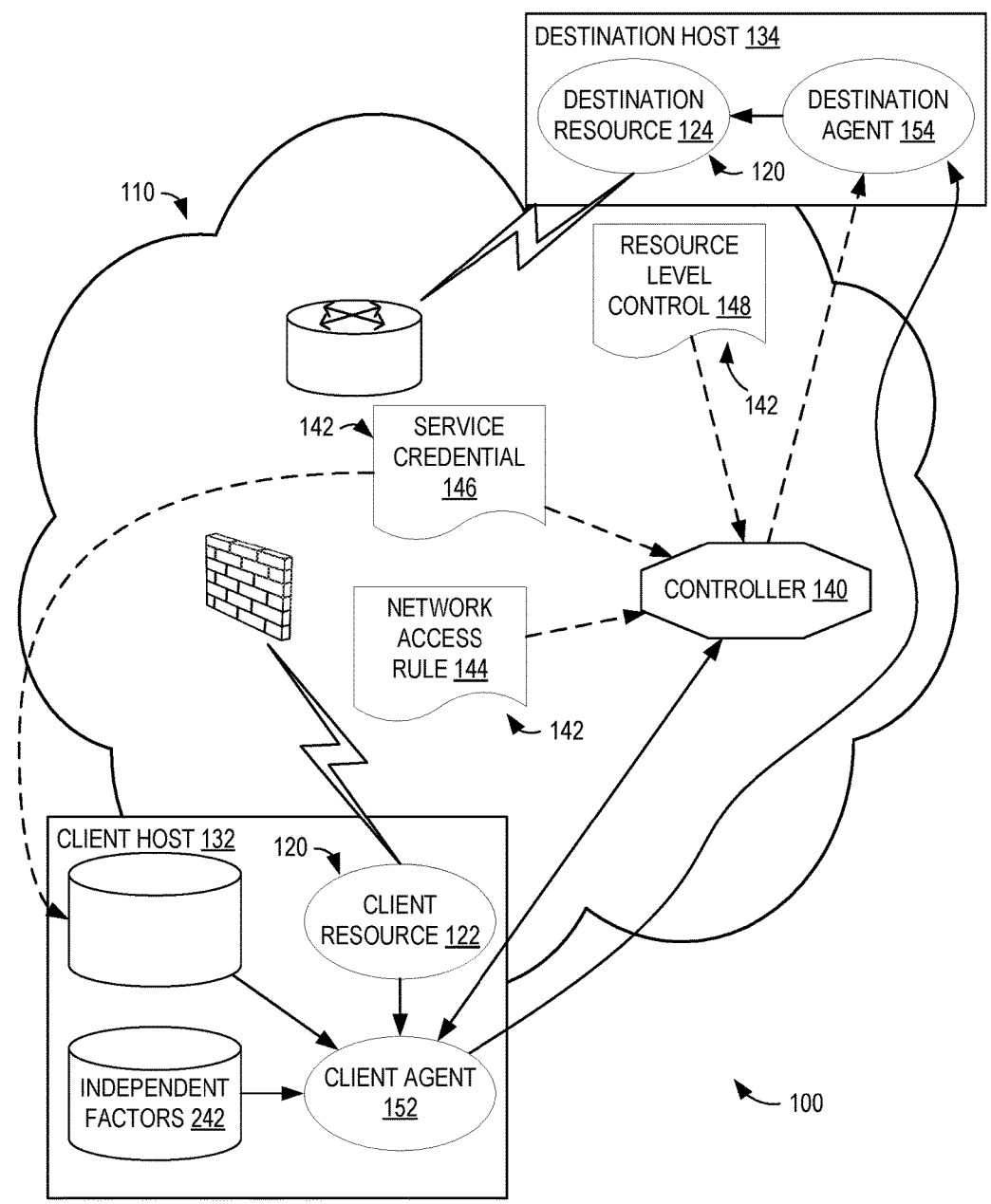
FIG. 1 is a block diagram of an example environment for exchanging network communications.

The subject matter described herein relates generally to networked services and, more specifically, to methods and systems for authenticating and authorizing one or more networked services. Examples of the disclosure may be used, for example, to transparently enhance one or more authentication and authorization (AuthNZ) systems for one or more networked services, without requiring any changes to the underlying networked services. In this manner, the examples described herein facilitate reducing security vulnerabilities in the networked services while simplifying a security of protected resources.

As used herein, the term "transparent" refers to an ability or capacity to act or function independent of one or more other entities. A transparent operation, for example, may be implemented or performed by an entity without calling for one or more operations from another entity. In this manner, one or more transparent operations may be implemented or performed without knowledge or awareness of one or more other entities.

Subject matter described herein includes transparently injecting one or more tokens into a network communication. The tokens may be injected, for example, using a high-entropy, shared-secret mechanism. The tokens may include one or more security policies (e.g., network access rules, credentials, resource level controls) that may be used to determine whether a networked service is allowed to access or use another networked service. The security policies may be associated, for example, with one or more security systems (e.g., firewalls, content management systems, identity management systems, access management systems, authentication systems, authorization systems) that selectively restrict access to a protected resource at one or more levels of a network infrastructure.

Aggregating and structuring security policies associated with one or more networked services enables the examples described herein to authenticate and/or authorize the networked services to perform one or more operations in an efficient and effective manner The systems described herein enable a networked service to be authenticated and/or authorized, for example, without adversely affecting a functionality of the networked service and/or the content of its communications. Examples of the disclosure may function without any intervention or additional input from one or more networked services. That is, the networked services need not be modified in order for the examples described herein to operate as described herein. Examples of the disclosure may also function in a manner that is invisible or imperceptible to a user of the networked services. For example, one or more transparent operations may be implemented or performed with little or no interruption in the services provided to the user (relative to those experienced when the services are provided without performance of the transparent operations).

While no personally identifiable information is tracked by the examples described herein, the examples have been described with reference to data being collected from and/or monitored at one or more entities. The data may be collected and/or monitored in accordance with applicable data privacy laws and regulations. For example, a user may be provided with a notice of the data being collected and/or monitored (e.g., via a dialog box or preference setting) and/or an opportunity to give or deny consent for the collection and/or monitoring of the data. The consent may take the form of opt-in consent or opt-out consent.

Aspects of the disclosure provide for a computing system that performs one or more operations in an environment including a plurality of devices coupled to each other via a network (e.g., a local area network (LAN), a wide area network (WAN), the Internet). For example, a control system may communicate with one or more host systems and/or security systems to facilitate communication between a plurality of networked services. In this manner, data associated with a networked service may be efficiently obtained from a plurality of data sources and timely used to enhance one or more authentication and authorization systems associated with the networked service.

The systems and processes described herein may be implemented using computer programming or engineering techniques including computer software, firmware, hardware or a combination or subset thereof. At least one technical problem with known computing systems is that, with the sheer magnitude of data available or accessible to a computing system, it can be difficult, time-consuming, and/or onerous to aggregate and structure authorization and authentication data from a plurality of sources. The examples described herein address at least this technical problem.

By authenticating and/or authorizing one or more networked services in the manner described in this disclosure, the examples described herein reduce security vulnerabilities in networked services while simplifying how protected resources are secured. Some examples improve data security, processor security, and/or data transmission security by managing access to and use of various protected resources, using communications with cryptographically-signed tokens, limiting the windows in which tokens are valid, and/or using independent factors to authenticate networked services and issue tokens. Additionally, some examples improve user experience, user interaction performance, user efficiency, and/or communication between systems by providing a secure communication environment. The control system described herein, for example, includes a controller and a plurality of independently-deployed agents that reduce system redundancies, processor load, and/or network bandwidth usage.

The technical effect of the systems and processes described herein is achieved by performing at least one of the following operations: a) identifying a first service of a plurality of networked services; b) generating a registration request associated with the first service; c) receiving one or more tokens associated with the first service; d) identifying a communication transmitted from the first service and directed to a second service of the plurality of networked services; e) determining whether the communication includes a network request; f) transparently injecting the tokens into the communication for use in authenticating and authorizing the first service; and/or g) transmitting the communication to the second service in accordance with one or more security policies associated with the second service.

FIG. 1 shows an example environment 100 for exchanging one or more communications over one or more networks 110. A network 110 enables information to be communicated between a plurality of networked members 120 coupled to the network 110. A networked member 120, for example, may access or be accessed by one or more other networked members 120 via the network 110. Networked members 120 may be or include one or more components (e.g., web container) and/or perform one or more processes (e.g., process trees) that provide one or more related computing capabilities, such as data storage, manipulation, presentation, and/or communication.

In some examples, the networked members 120 include one or more client services or resources 122 that transmit one or more network communications and one or more destination services or resources 124 that receive one or more network communications. A client resource 122, for example, may access or use one or more protected resources on various destination resources 124 over the network 110. In a collection of networked members 120, each individual networked member 120 may act or function as a client resource 122 and/or as a destination resource 124. A particular network member 120, for example, may function as a client resource 122 in some instances (e.g., when transmitting a network communication) while functioning as a destination resource 124 in other instances (e.g., when receiving a network communication).

A networked member 120 may be implemented in a wide variety of ways including, without limitation, as a set of one or more related processes running on a virtual or physical host 130 and/or as a set of replica processes spread across multiple hosts 130. The client resource 122 and destination resource 124, for example, may perform one or more operations at a client host 132 and destination host 134, respectively. The client host 132 and/or destination host 134 may be at one or more virtual or physical computing systems. In some examples, the client host 132 and destination host 134 perform one or more operations at a common computing system.

Network communications may be transmitted between networked members 120 over one or more networks 110 connecting the networked members 120 using wired cables and/or wireless technologies. A network communication may be selectively routed in and/or through the environment 100, for example, via one or more layers provided by one or more applications, operating systems, network card device drivers, and/or networking hardware. Example networks 110 include a personal area network (PAN), a local area network (LAN), a wide area network (WAN), a metropolitan area network (MAN), and the like. In some examples, a client resource 122 transmits a network communication (e.g., network request) to a destination resource 124 over a network 110 to access or use the destination resource 124.

The environment 100 includes one or more controllers 140 that monitor and control network traffic (e.g., network communications) between the networked members 120. Network traffic may be controlled, for example, using one or more security policies 142 to protect one or more protected resources on one or more destination resources 124. Example security policies 142 include a network access rule 144, a long-lived service credential 146, a destination resource-specific resource level control 148, and the like. In some examples, a controller 140 formats data and/or controls network traffic using an Open Systems Interconnection (OSI) model to enable the networked members 120 to communicate using one or more communication protocols.

In some examples, the controller 140 performs and/or directs one or more operations to facilitate communication between the client resource 122 and the destination resource 124. The operations may be performed and/or directed, for example, in accordance with the security policies 142. The controller 140 may administer the security policies 142 to provide a unified control plane that enables the client resource 122 to access or use the destination resource 124. The controller 140 may deploy, for example, a client agent 152 associated with the client resource 122 and/or a destination agent 154 associated with the destination resource 124. The client agent 152 and destination agent 154 performs one or more operations at the client host 132 and destination host 134, respectively. In this manner, the unified control plane may transparently insert, read, and/or delete data in service-to-service communications (e.g., a Transmission Control Protocol/Internet Protocol (TCP/IP) connection).

Figure 2:
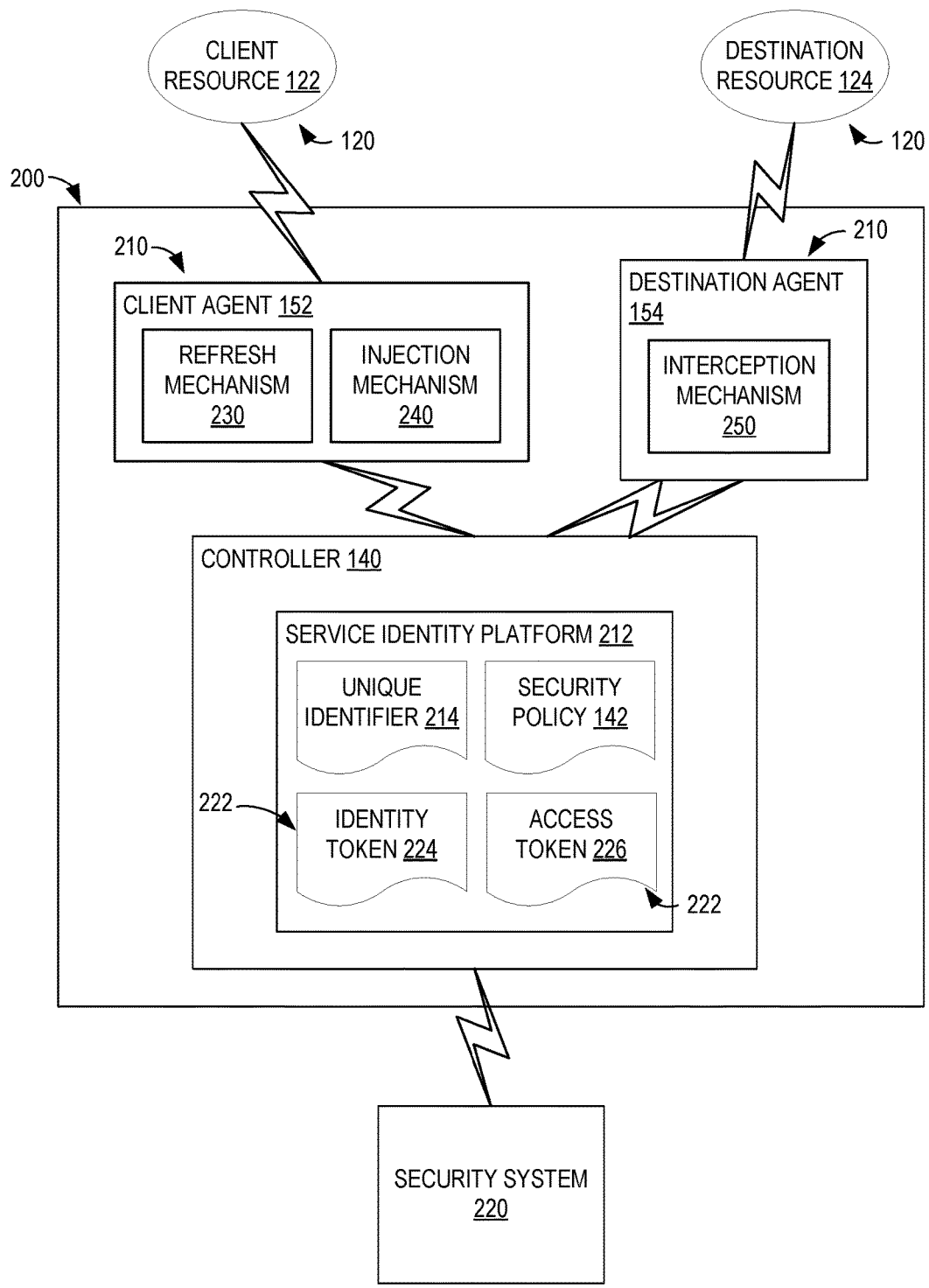
FIG. 2 is a block diagram of an example system that enables a first service to access or use another service in an environment, such as the environment shown in FIG. 1.

FIG. 2 shows an example control system 200 that enables the client resource 122 (e.g., a first service) to access or use the destination resource 124 (e.g., a second service) in the environment 100 (shown in FIG. 1). The control system 200 provides a centralized system that automatically discovers networked members 120 and their communications. The control system 200 includes a controller 140 and a plurality of agents 210 (e.g., client agent 152, destination agent 154). The agents 210 may run or reside, for example, at one or more hosts 130 (e.g., host systems, shown in FIG. 1) of their respective networked members 120. In some examples, a networked member 120 and an agent 210 associated with the networked member 120 may run or reside at a common host 130.

During a registration phase, one or more networked members 120 (e.g., networked services) may be automatically discovered at one or more hosts 130. In some examples, the controller 140 scans the hosts 130 to search for networked members 120 using mapped data, identifiers, and/or directories. The networked members 120 may be detected or identified, for example, (a) using a fingerprint computed based on rules that specify predicates over a set of attributes (e.g., cryptographic hash of binary executable file, internet protocol (IP) address, media access controller (MAC) address, basic input/output system (BIOS), universally unique identifier (UUID)), (b) using a fingerprint computed by integration with an application delivery pipeline (e.g., during a build phase where a service binary file is created with data such as a dependent library or package, detailed static image analysis, binary checksum, etc.), (c) explicitly indicating the networked members 120 (e.g., using mechanisms such as labels, environment variables, user interface (UI) forms, etc.), and/or (d) integrating with a lightweight directory access protocol (LDAP) that has a list of registered service accounts associated with the networked members 120. In some examples, the controller 140 communicates with a client host 132 (e.g., a first host system, shown in FIG. 1) and destination host 134 (e.g., a second host system, shown in FIG. 1) to detect or identify the client resource 122 and the destination resource 124, respectively.

The controller 140 registers the networked member 120 with a service identity platform 212. The networked members 120 may be registered, for example, as the networked members 120 are detected or identified by the controller 140. In some examples, an agent 210 generates a request to register a networked member 120 associated with the agent 210. Once registered, each networked member 120 is assigned with a unique identifier 214 and associated with one or more security policies 142. The controller 140 may obtain one or more security policies 142 associated with a networked member 120, for example, from one or more security systems 220 (e.g., firewall, content management system, identity management system, access management system, authentication system, authorization system) associated with the networked member 120.

In some examples, the controller 140 classifies the network members 120 into one or more type groups (e.g., database, log, message bus, application server, storage server), and associates the networked members 120 with one or more security policies 142 based on the type groups. Each type group may be associated, for example, with one or more security policies 142 that are common or shared within the type group. The classification may be performed using one or more supervised or unsupervised machine learning techniques over a feature vector space and/or performed explicitly by one or more users associated with the security systems 220 (e.g., using mechanisms such as labels, environment variables, UI forms, etc.).

The controller 140 generates a plurality of tokens 222 associated with the unique identifier 214 and security policies 142. The tokens 222 may map or link the networked members 120 with the security policies 142, for example In some examples, the tokens 222 include one or more identity tokens 224 (e.g., JavaScript Object Notation (JSON) Web Token (JWT) authentication token) and one or more access tokens 226 (e.g., Oauth2 access token).

Identity tokens 224 enable a network member 120 to be identified and authenticated. A network communication including or associated with an identity token 224, for example, enables its recipient (e.g., destination resource 124, destination agent 154) to verify that the network communication is coming from an authenticated user (e.g., client resource 122, client agent 152). Identity tokens 224 (e.g., key) may be used by a sender, for example, to generate a certificate for transmission with the network communication, and a holder of a corresponding identity token 224 may authenticate the sender and/or decrypt the network communication. In some examples, the identity tokens 224 enable the network communication to be securely transmitted between networked members 210 and/or tracked.

Access tokens 226 enable a networked member 120 to be authorized to perform one or more operations. In some examples, a networked member 120 may use an access token 226 to articulate and share one or more security policies 142 for communicating with the networked member 120. A network communication including or associated with an access token 226, for example, enables its recipient (e.g., destination resource 124, destination agent 154) to verify that its sender (e.g., client resource 122, client agent 152) is authorized to perform one or more operations. Access tokens 226 associated with a network member 120 may include or be associated with one or more security policies 142 associated with the networked member 120. In this manner, an access token 226 associated with a destination resource 124 may be used to direct a network communication toward the destination resource 124 and allow its sender (e.g., client resource 122, client agent 152) to access or use a protected resource on the destination resource 124 in accordance with the security policies 142.

The tokens 222 are provided to the agents 210. The controller 140 may generate an agent 210 including one or more identity tokens 224 associated with a networked member 120 (e.g., a first service) and/or one or more access tokens 226 associated with one or more other networked members 120 (e.g., second services), and deploy the generated agent 210 to the host 130 of the networked member 120. In some examples, the controller 140 transmits one or more identity tokens 224 associated with the networked member 120 and/or one or more access tokens 226 associated with one or more other networked members 120 to an agent 210 associated with the networked member 120 at the host 130 of the networked member 120. Tokens 222 may be transmitted, for example, in response to a token request including one or more service credentials 146.

Tokens 222 may be short-lived. That is, at least some tokens 222 may automatically expire after a predetermined time period. The predetermined time period may be specified, for example, by one or more users of the networked members 120 (e.g., administrators). In some examples, the control system 200 has one or more refresh mechanisms 230 configured to re-generate or refresh or one or more tokens 222. Tokens 222 may be refreshed, for example, at one or more predetermined time intervals and/or event occurrences. In some examples, an agent 210 determines whether one or more tokens 222 are expired, and generates a request to refresh a token 222 if the token 222 is determined to be expired.

At runtime, the control system 200 provides a centralized system to automatically administer one or more security policies 142 for accessing or using one or more protected resources on one or more destination resources 124. During a run phase, the control system 200 automatically detects one or more networked members 120 running in the environment 100. A networked member 120 may be detected, for example, by an agent 210 monitoring the networked member 120 for one or more application-layer operations and/or protocol used by the networked member 120. Once detected, the control system 200 automatically signs the networked member 120 onto the service identity platform 212, and obtains a plurality of tokens 222 associated with the networked member 120 (e.g., one or more identity tokens 224 associated with a client resource 122 and one or more access tokens 226 associated with one or more destination resource 124) for use in accessing or using one or more other networked members 120.

In some examples, a client agent 152 intercepts one or more network communications (e.g., outgoing requests to access or use a destination resource 124) and injects one or more tokens 222 into the network communications during transit. The client agent 152 may include, for example, an injection mechanism 240 that enhances the network communication using one or more tokens 222 associated with the client agent 152. In some examples, the injection mechanism 240 identifies one or more appropriate tokens 222 (e.g., identity token 224 associated with the client resource 122 and access token 226 associated with the destination resource 124) and injects the tokens 222 into the network communication.

The injection mechanism 240 may further enhance the network communication by validating the token 222 (e.g., to determine whether it is expired) and/or service credential 146 included in the network communication (e.g., to determine whether the network communication issued by the client resource 122 included a service credential 146 that is consistent with the service credential 146 used to generate the token 222), removing the service credential 146 from the network communication, and/or cryptographically signing the network communication. In some examples, the network communication is encrypted using one or more tokens 222 to facilitate secure transmission of the network communication. The network communication may be signed, for example, using a private key associated with its sender (e.g., client resource 122, client agent 152) and/or encrypted using a public key associated with its recipient (e.g., destination resource 124, destination agent 154). Additionally or alternatively, the injection mechanism 240 may communicate with one or more entities different from the client resource 122 and/or destination resource 124 to obtain and validate one or more independent factors 242 (shown in FIG. 1) for use in authenticating the client resource 122 (e.g., multiple-factor authentication).

The injection mechanism 240 may be transparently inserted into an existing data path between the client resource 122 and destination resource 124, without requiring any special traffic forwarding rules from the client resource 122 and/or the destination resource 124, and without performing connection termination, which is intrusive and potentially disruptive. The injection mechanism 240 may operate, for example, at a transport layer of the OSI model (e.g., TCP or User Datagram Protocol (UDP)), independent of an application protocol (e.g., Hypertext Transfer Protocol (HTTP)) used by the network request.

In some examples, a destination agent 154 intercepts one or more network communications (e.g., incoming requests to access or use the destination resource 124) and determines whether to forward the network communications onto the destination resource 124. The destination agent 152 may include an interception mechanism 250 that intercepts the network communications and extracts and cryptographically validates the tokens 222 for use in determining whether to allow the client resource 122 to access or use the destination resource 124.

The interception mechanism 250 may also decrypt the network communication to view the relevant authorization policies (e.g., destination resource-specific level controls 148 associated with the destination resource 124). The network communication may be cryptographically validated, for example, using a public key associated with the sender (e.g., client resource 122, client agent 152) and/or decrypted using a private key associated with the recipient (e.g., destination resource 124, destination agent 154). The relevant authorization policies may be used to recognize resource-level privileges and enforce resource-level rules at the destination resource 124. The authorization policies may identify, for example, whether the client resource 122 is authorized to create, read, update, and/or delete protected resources (e.g., content, database tables, uniform resource identifiers (URIs)) on the destination resource 124. In some examples, the destination agent 154 communicates with the controller 140 to obtain one or more other security policies 142 associated with the client resource 122.

Figure 3:
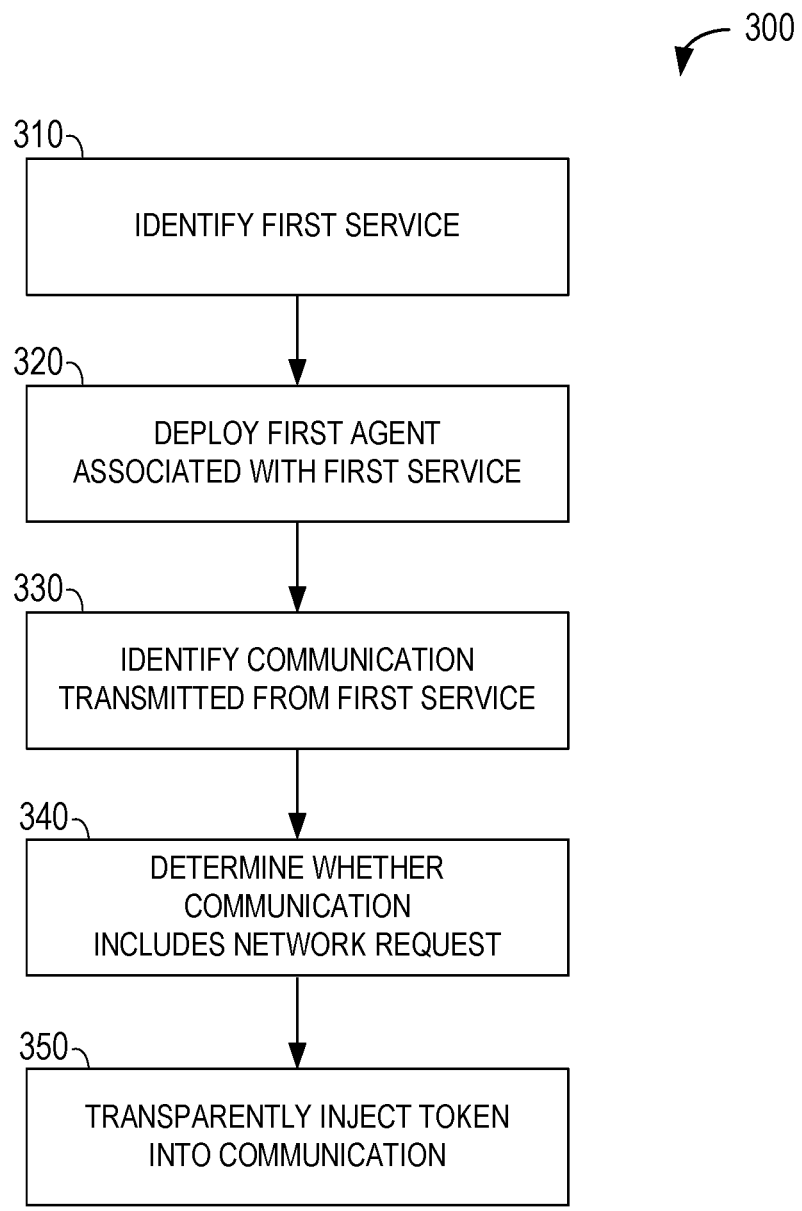
FIG. 3 is a flowchart of an example method for facilitating communication between a plurality of networked services in an environment, such as the environment shown in FIG. 1.

FIG. 3 illustrates an example method 300 for facilitating communication between a plurality of networked members 120 (e.g., networked services) using the system 200 (shown in FIG. 2). A client resource 122 (e.g., a first service) is identified at operation 310 at a client host 132 (e.g., a first host system). The client resource 122 may be identified, for example, during a registration phase of the method 300. The client resource 122 may be registered with a service identity platform 212, at which the client resource 122 is assigned with a unique identifier 214 and associated with one or more security policies 142. The security policies 142 may be obtained from one or more security systems 220 and/or identified based on one or more type groups in which the client resource 122 is classified.

A client agent 152 (e.g., a first agent) associated with the client resource 122 is deployed at operation 320 to the client host 132. The client agent 152 includes one or more tokens 222 associated with the client resource 122 (e.g., identity token 224 associated with the client resource 122 and one or more access tokens 226 associated with one or more destination resources 124). Access tokens 226 may include one or more security policies 142 associated with one or more destination resources 124 on which the client agent 152 may access or use one or more protected resources. Network access rules 144 enable network infrastructure (e.g., routers, switches, firewalls) to route a network communication between the client resource 122 and the destination resource 124. Service credentials 146 enable the destination resource 124 and/or destination agent 154 to identify one or more entities (e.g., client resource 122) authorized to access or use the protected resources on the destination resource 124. In some examples, the service credentials 146 may be used or combined with one or more independent factors 242 that may be used to confirm an identity of one or more entities. Resource level controls 148 enable the destination resource 124 to identify one or more allowed operations.

A network communication transmitted from the client resource 122 and directed to the destination resource 124 is identified at operation 330 at the client agent 152. The client agent 152 may monitor the client resource 122 for one or more network communications issued by the client resource 122 and determine at operation 340 whether the network communication is or includes a network request. If the network communication includes a network request, one or more tokens 222 are injected at operation 350 into the network communication for use in authenticating and/or authorizing the client resource 122 in accordance with one or more security policies 142 included in the tokens 222.

Generally, the client agent 140 may identify a desired data path for the network communication based on various factors (e.g., segmentation, conditions, security policies 142). Security policies 142 associated with the destination resource 124, for example, may be compared with security policies 142 associated with the client resource 122 to identify one or more data paths that would comply with security policies 142 associated with both the destination resource 124 and the client resource 122. The security policies 142 associated with the destination resource 124 may be identified using an access token 226.

If multiple authentication factors are required, the client agent 152 may communicate with one or more entities (other than client resource 122 and/or destination resource 124) to obtain and/or present the multiple authentication factors on behalf of the client resource 122. Example authentication factors include a long-lived service credential 146 assigned to the client resource 122 (e.g., password) and independent factors 242, including a signature of one or more binaries and/or processes used by the client resource 122, a characteristic (e.g., IP address, MAC address) of the client host 132 (e.g., physical machine, virtual machine, container), a factor stored in hardware (e.g., cryptographic key stored on a trusted platform module), a one-time password exposed by an underlying hypervisor, and the like. Multiple authentication factors may be presented to the controller 140, for example, to obtain one or more tokens 222 from the service identity platform 212.

The controller 140 may validate the authentication factors provided by the client agent 152. If the authentication factors are valid, the controller 140 generates one or more tokens 222, and provides the tokens 222 to the client agent 152. The tokens 222 may be cryptographically signed and/or encrypted. Alternatively, authentication and authorization of the client resource 122 may be handled separately through separate interactions (e.g., with separate controllers 140). For example, an authentication controller may issue one or more identity tokens 224 (e.g., JavaScript Object Notation (JSON) Web Token (JWT) authentication token), and an authorization controller may issue one or more access tokens 226 (e.g., Oauth2 access token) specifying authorization scope.

Figure 4:
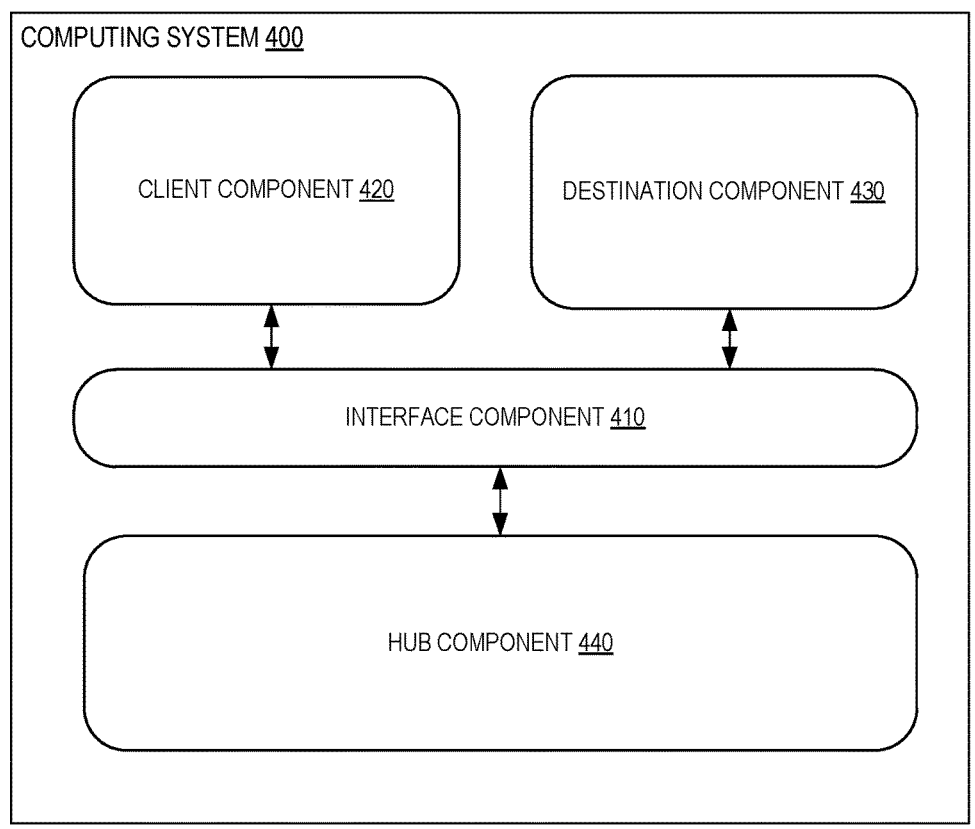
FIG. 4 is a block diagram of a computing system for facilitating communication between a plurality of networked services in an environment, such as the environment shown in FIG. 1.

FIG. 4 shows an example computing system 400 that may be used to facilitate communication between a plurality of networked members 120 (e.g., networked services) using the control system 200 (shown in FIG. 2). The computing system 400 may be configured, for example, to transparently authenticate and/or authorize a networked service (e.g., client resource 122) for another networked service (e.g., destination resource 124), without requiring any changes to the underlying networked services. The computing system 400 includes an interface component 410, a client component 420, a destination component 430, and a hub component 440.

The interface component 410 facilitates communication between and among software components, computer hardware, peripheral devices, and/or users. The interface component 410 may allow, for example, the client component 420, destination component 430, and/or hub component 440 to exchange information with each other. In this manner, the interface component 410 may facilitate communication between a user and the client component 420, destination component 430, and/or hub component 440. In some examples, the interface component 410 enables the client component 420 to receive data from and/or present data to the user. The interface component 410 may communicate, for example, with a user interface that allows the user to enter one or more commands and/or provide information (e.g., user input) to the client component 420.

The client component 420 controls one or more operations associated with the client resource 122 (e.g., a first service). The client component 420 may monitor the client resource 122, intercept one or more outgoing network requests (e.g., network requests transmitted from the client resource 122), and transparently inject one or more tokens 222 associated with the client resource 122 (e.g., identity token 224 associated with the client resource 122 and/or one or more access tokens 226 associated with one or more destination resources 124) into the network requests while the network requests are in transit to one or more destination resources 124 (e.g., second services).

Identity tokens 224 associated with the client resource 122 enable the client resource 122 and/or a client agent 152 associated with the client resource 122 to be authenticated, and may be used to encrypt the network request. The network requests may be transmitted in accordance with one or more security policies 142 included in or associated with one or more access tokens 226. For example, the security policies 142 enable the network requests to be selectively transmitted to the destination resources 124 in accordance with one or more network access rules 144, service credentials 146, and/or destination resource-specific resource level controls 148. In some examples, the client component 420 tracks the network requests using the tokens 222.

In some examples, the client component 420 determines whether a service credential 146 and/or token 222 satisfy a predetermined client security threshold. An authentication system associated with the destination resource 124, for example, may provide a service credential 146 for a client resource 122 to present when requesting access or use of the destination resource 124 (e.g., a valid service credential 146). The client component 420 may compare the service credential 146 included in and/or associated with the tokens 222 with the valid service credential 146 to determine whether the service credential 146 and/or token 222 are valid. Additionally or alternatively, the client component 420 may compare the service credential 146 in the network request (e.g., obtained from a user of the service resource 122) with the service credential 146 included in and/or associated with the tokens 222 (e.g., obtained from the controller 130) to determine whether the service credential 146 in the network request is valid.

In some examples, the service credential 146 and/or token 222 are short-lived and, thus, automatically expire after a respective predetermined time period, when they become invalid. If a service credential 146 used to generate a token 222 (e.g., identity token 224) becomes expired or the token 222 itself is expired, the token 222 is not valid, and a request to obtain a valid service credential 146 and/or token 222 (e.g., a request to refresh) may be transmitted to the hub component 430 for processing.

If the service credential 146 included in or associated with the tokens 222 is the same, equivalent to, or representative of the valid service credential 146 and the tokens 222 are valid, the client security threshold is satisfied, and the token 222 may be validated. Otherwise, the client security threshold is not satisfied, and the token 222 may not be validated. In some examples, an outgoing network request including no token or an invalid token 222 is blocked from being transmitted to the destination resource 124.

The destination component 430 controls one or more operations associated with the destination resource 124. The destination component 420 may monitor the destination resource 124, intercept one or more incoming network requests (e.g., network requests transmitted to the destination resource 124), extract one or more tokens 222 from the network requests, and determine whether the tokens 222 satisfy a predetermined destination security threshold.

In some examples, the destination component 430 cryptographically validates the identity token 224 to authenticate the client resource 122. If the identity token 224 is cryptographically validated, the destination security threshold is satisfied, and the network request may be forwarded to the destination resource 124. Otherwise, the destination security threshold is not satisfied, and the network request may be blocked from being transmitted to the destination resource 124. In some examples, an error response is generated for transmission to the client resource 122 if the predetermined destination security threshold is not satisfied.

If the network request and/or access tokens 226 are encrypted, the destination component 430 decrypts the network request and/or access tokens 226 to view the security policies 142 included in network request and/or access tokens 226. Resource level controls 148, for example, may be used to recognize resource-level privileges and enforce resource-level rules at the destination resource 124. Additionally, the destination component 430 may transmit a request to obtain one or more other security policies 142 to the hub component 430 for processing.

The hub component 440 enables the client component 420 and destination component 430 to function as described herein, and enables the control system 200 to monitor one or more networked members 120. The hub component 440 may register one or more networked members 120 (e.g., client resource 122, destination resource 124) with a service identity platform 212. The service identity platform 212 may include, for example, one or more unique identifiers 214 that enable the networked members 120 to be uniquely identified, one or more type groups associated with each networked member 120, and one or more security policies 142 associated with each networked member 120. In some examples, the hub component 440 includes contact data associated with one or more security systems 220 (e.g., for obtaining security policies 142).

The hub component 440 may process one or more registration requests, for example, to register data with the service identity platform 212. A registration request may be processed, for example, to associate a unique identifier 214, one or more type groups, and one or more security policies 142 with a networked resource 120. Data may be registered with the service identity platform 212 such that the interface component 310, client component 320, destination component 330, and/or hub component 340 may access and/or use the data in an efficient manner.

The hub component 440 generates one or more tokens 222, and provides the client component 420 with the tokens 222. The hub component 440 enables the system 200 to manage and administer data associated with one or more networked members 120. The hub component 440 may generate one or more identity tokens 224 that enable the control system 200 to identify and/or authenticate an entity (e.g., networked member 120, client resource 122, destination resource 124, host 130, client host 132, destination host 134, controller 140, client agent 152, destination agent 154, agent 210, security system 220). The identity tokens 224 may be used, for example, to selectively allow one or more client resources 122 to be identified and authenticated as authorized users of the destination resources 124. The hub component 440 may also generate one or more access tokens 226 that enable the control system 200 to locate and/or approach the entity for communicating (e.g., via the interface component 410) with the entity. The access tokens 226 may be used, for example, to identify or determine one or more allowed operations for the authorized users.

In this manner, the tokens 222 may allow the destination agent 154 to use a public key to verify that a holder of the corresponding private key (e.g., client resource 122, client agent 152) sent a network request, and/or use a private key to decrypt the network request encrypted by a holder of the corresponding public key (e.g., client resource 122, client agent 152). In some examples, the tokens 122 enable the client agent 152 to locate and/or approach the destination resource 124 in accordance with one or more security policies 132 associated with the destination resource 124. Additionally, the tokens 122 may enable the destination agent 154 to identify and/or authenticate the client resource 122 and allow the client resource 122 and/or client agent 152 to perform one or more operations in accordance with one or more security policies 132 associated with the destination resource 124.

Figure 5:
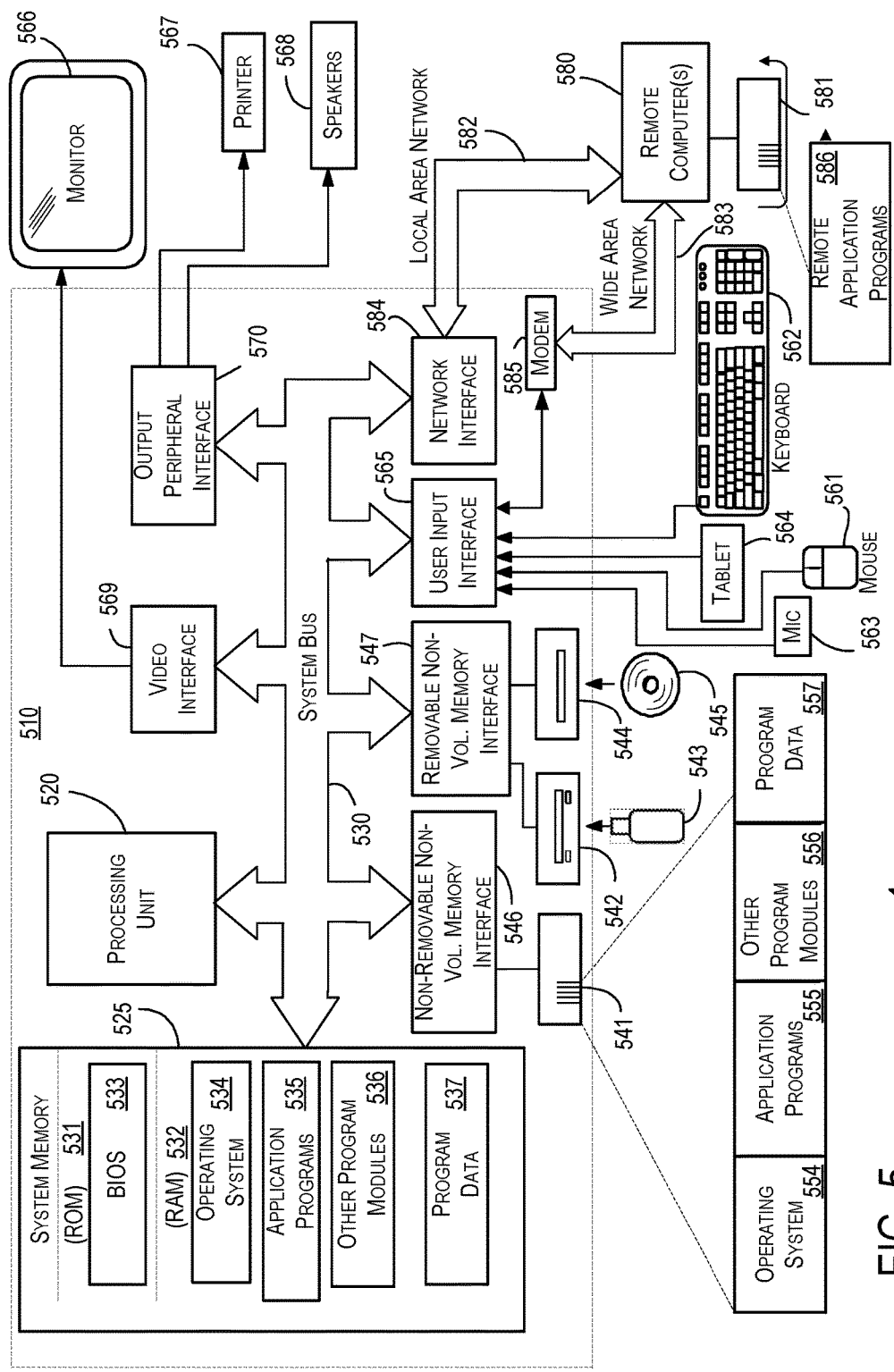
FIG. 5 is a block diagram illustrating an example operating environment in which a computing system, such as the control system shown in FIG. 4, may be operated.

FIG. 5 shows an example operating environment 500 in which the control system 200 may be operated. The operating environment 500 is only one example of a computing and networking environment and is not intended to suggest any limitation as to the scope of use or functionality of the disclosure. The operating environment 500 should not be interpreted as having any dependency or requirement relating to any one or combination of components illustrated in the example operating environment 500.

The disclosure is operational with numerous other computing and networking environments or configurations. While some examples of the disclosure are illustrated and described herein with reference to the operating environment 500 being or including the control system 200 (shown in FIG. 2), controller 140 (shown in FIG. 1), client agent 152 (shown in FIG. 1), and/or destination agent 154 (shown in FIG. 1), aspects of the disclosure are operable with any computing system that executes instructions to implement the operations and functionality associated with the operating environment 500 (e.g., networked member 120, client resource 122, destination resource 124, host 130, client host 132, destination host 134, agent 210, security system 220).

For example, the operating environment 500 may include a mobile device, a tablet, a laptop computer, a desktop computer, a server computer, a microprocessor-based system, a multiprocessor system, a communication devices in a wearable or accessory form factor (e.g., a watch, glasses, a headset, earphones, and the like), programmable consumer electronics, a portable media player, a gaming console, a set top box, a kiosk, a tabletop device, an industrial control device, a minicomputer, a mainframe computer, a network computer, a distributed computing environment that includes any of the above systems or devices, and the like. The operating environment 500 may represent a group of processing units or other computing systems. Additionally, any computing system described herein may be configured to perform any operation described herein including one or more operations described herein as being performed by another computing system.

With reference to FIG. 5, an example system for implementing various aspects of the disclosure may include a general purpose computing system in the form of a computer 510. Components of the computer 510 may include, but are not limited to, a processing unit 520 (e.g., a processor), a system memory 525 (e.g., a computer-readable storage device), and a system bus 530 that couples various system components including the system memory 525 to the processing unit 520. The system bus 530 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The system memory 525 includes any quantity of media associated with or accessible by the processing unit 520. For example, the system memory 525 may include computer storage media in the form of volatile and/or nonvolatile memory, such as read only memory (ROM) 531 and random access memory (RAM) 532. The ROM 531 may store a basic input/output system (BIOS) 533 that facilitates transferring information between elements within computer 510, such as during start-up. The RAM 532 may contain data and/or program modules that are immediately accessible to and/or presently being operated on by processing unit 520. For example, the system memory 525 may store computer-executable instructions, identifier data, usage data, location data, security data, and other data. By way of example, and not limitation, FIG. 5 illustrates operating system 534, application programs 535, other program modules 536, and program data 537.

The computer 510 includes a variety of computer-readable media. Computer-readable media may be any available media that may be accessed by the computer 510 and includes both volatile and nonvolatile media, and removable and non-removable media. By way of example, and not limitation, computer-readable media may comprise computer storage media and communication media. Computer storage media are tangible and mutually exclusive to communication media.

Computer storage media includes volatile and nonvolatile, removable and non-removable media implemented in any method or technology, such as semiconductor, magnetic, or optical technologies, for storage of information, such as computer-executable instructions, data structures, program modules or other data. Example computer storage media includes, but is not limited to, ROM 531, RAM 532, electrically erasable programmable read-only memory (EEPROM), solid-state memory, flash memory, a hard disk, magnetic storage, floppy disk, magnetic tape, a compact disc (CD), a digital versatile disc (DVD), a Blu-ray Disc® brand optical disc, an ultra density optical (UDO) disc, or any other medium which may be used to store the desired information and which may be accessed by the computer 510. (Blu-ray Disc® is a registered trademark of Blu-ray Disc Association). Computer storage media are implemented in hardware and exclude carrier waves and propagated signals. Computer storage media for purposes of this disclosure are not signals per se.

Communication media typically embodies computer-executable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media.

By way of example only, FIG. 5 illustrates a hard disk drive 541 that reads from or writes to non-removable, nonvolatile magnetic media, a universal serial bus (USB) port 542 that reads from or writes to a removable, nonvolatile memory 543, and an optical disk drive 544 that reads from or writes to a removable, nonvolatile optical disk 545. Other removable/non-removable, volatile/nonvolatile computer storage media that may be used in the example operating environment include, but are not limited to, solid state memory, flash memory, and the like. The hard disk drive 541 may be connected to the system bus 530 through a non-removable memory interface such as interface 546, and magnetic disk drive 542 and optical disk drive 544 may be connected to the system bus 530 by a removable memory interface, such as interface 547.

The drives and their associated computer storage media, described above and illustrated in FIG. 5, provide storage of computer-executable instructions, data structures, program modules, components (e.g., interface component 410, client component 420, destination component 430, hub component 440), applications, and other data for the computer 510. In FIG. 5, for example, hard disk drive 541 is illustrated as storing operating system 554, application programs 555, other program modules 556 and program data 557. Note that these components may either be the same as or different from operating system 534, application programs 535, other program modules 536, and program data 537. Operating system 554, application programs 555, other program modules 556, and program data 557 are given different numbers herein to illustrate that, at a minimum, they are different copies.

The processing unit 520 includes any quantity of processing units, and the instructions may be performed by the processing unit 520 or by multiple processors within the operating environment 500 or performed by a processor external to the operating environment 500. The processing unit 520 may be programmed to execute the computer-executable instructions for implementing aspects of the disclosure, such as those illustrated in the figures (e.g., FIG. 3). For example, the processing unit 520 may execute an interface component 410 (shown in FIG. 4), a client component 420 (shown in FIG. 4), a destination component 430 (shown in FIG. 4), and/or a hub component 440 (shown in FIG. 4) for implementing aspects of the disclosure.

Upon programming or execution of these components, the operating environment 500 and/or processing unit 520 is transformed into a special purpose microprocessor or machine. For example, the client component 420, when executed by the processing unit 520, causes the computer 510 to identify a first service, generate a registration request associated with the first service, receive one or more tokens associated with the first service, identify a communication transmitted from the first service and directed to a second service, determine whether the communication includes a network request, transparently inject the tokens into the communication, and/or automatically transmit the communication to the second service in accordance with one or more security policies associated with the second service; and/or the hub component 440, when executed by the processing unit 520, causes the computer 510 to deploy a first agent associated with the first service. Although the processing unit 520 is shown separate from the system memory 525, examples of the disclosure contemplate that the system memory 525 may be onboard the processing unit 520 such as in some embedded systems.

A user may enter commands and information into the computer 510 through one or more input devices, such as a pointing device 561 (e.g., mouse, trackball, touch pad), a keyboard 562, a microphone 563, and/or an electronic digitizer 564 (e.g., on a touchscreen). Other input devices not shown in FIG. 5 may include a joystick, a game pad, a controller, a camera, a scanner, an accelerometer, a satellite dish, or the like. The computer 510 may accept input from the user in any way, including from input devices, via gesture input, via proximity input (such as by hovering), and/or via voice input. These and other input devices may be coupled to the processing unit 520 through a user input interface 565 that is coupled to the system bus 530, but may be connected by other interface and bus structures, such as a parallel port, game port or the USB port 542.

Information, such as text, images, audio, video, graphics, alerts, and the like, may be presented to a user via one or more presentation devices, such as a monitor 566, a printer 567, and/or a speaker 568. Other presentation devices not shown in FIG. 5 may include a projector, a vibrating component, or the like. These and other presentation devices may be coupled to the processing unit 520 through a video interface 569 (e.g., for a monitor 566 or a projector) and/or an output peripheral interface 570 (e.g., for a printer 567, a speaker 568, and/or a vibration component) that are coupled to the system bus 530, but may be connected by other interface and bus structures, such as a parallel port, game port or the USB port 542. In some examples, the presentation device is integrated with an input device configured to receive information from the user (e.g., a capacitive touch-screen panel, a controller including a vibrating component). Note that the monitor 566 and/or touch screen panel may be physically coupled to a housing in which the computer 510 is incorporated, such as in a tablet-type personal computer.

The computer 510 may operate in a networked environment using logical connections to one or more remote computers, such as a remote computer 580. The remote computer 580 may be a personal computer (PC), a server, a router, a network PC, a peer device or other common network node, and typically includes many or all of the elements described above relative to the computer 510, although only a memory storage device 581 has been illustrated in FIG. 5. The logical connections depicted in FIG. 5 include one or more local area networks (LANs) 582 and one or more wide area networks (WANs) 583, but may also include other networks. Such networking environments are commonplace in offices, enterprise-wide computer networks, intranets and the Internet.

When used in a LAN networking environment, the computer 510 is coupled to the LAN 582 through a network interface or adapter 584. When used in a WA networking environment, the computer 510 may include a modem 585 or other means for establishing communications over the WAN 583, such as the Internet. The modem 585, which may be internal or external, may be connected to the system bus 530 via the user input interface 565 or other appropriate mechanism. A wireless networking component including an interface and antenna may be coupled through a device, such as an access point or peer computer to a LAN 582 or WAN 583. In a networked environment, program modules depicted relative to the computer 510, or portions thereof, may be stored in the remote memory storage device. By way of example, and not limitation, FIG. 5 illustrates remote application programs 586 as residing on memory storage device 581. It may be appreciated that the network connections shown are examples and other means of establishing a communications link between the computers may be used.

The block diagram of FIG. 5 is merely illustrative of an example system that may be used in connection with one or more examples of the disclosure and is not intended to be limiting in any way. Further, peripherals or components of the computing systems known in the art are not shown, but are operable with aspects of the disclosure. At least a portion of the functionality of the various elements in FIG. 5 may be performed by other elements in FIG. 5, or an entity (e.g., processor, web service, applications, server, computing system, etc.) not shown in FIG. 5.

Examples described herein reduce security vulnerabilities in networked services. For example, the cryptographically-signed tokens described herein are valid for a predetermined time period, limiting an opportunity for a potential attacker to use a leaked token. The long-lived service credentials described herein are combined with independent factors to authenticate a client service and/or obtain an authentication or authorization token, limiting an opportunity for a potential attacker to use a leaked service credential. The network communications described here include valid tokens, limiting an opportunity for a potential attacker to use a network-spoofing communication. The client hosts described herein use independent factors to authenticate a client service, limiting an opportunity for a potential attacker to use a breached host.

Moreover, examples described herein provide centralized resource-level visibility and control. The agents described herein are deployed independent of the networked services, require no application changes, and provide resource-level visibility. The controller described herein is a central point to administer network access rules, services credentials, and resource level controls for protecting a service. Further, the controller described herein is configured to identify inconsistent authentication patterns and alert administrators in real time about suspicious activity.

In some examples, the control system 200 operates by virtualizing system calls issued by networked services (e.g., networked members 120) that are related to sockets (e.g., connect, accept, read, write). The control system 200 may transparently convey identity tokens or access tokens on network communications between client resources 122 and destination resources 124. The control system 200 is independent of application layer protocols and, therefore, is configurable to operate with a wide range of protocols, including HTTP, memcached, mysql, etc.

The control system 200 is also configurable to operate for encrypted connections that use, for example, IP Security (IPsec) or Transport Layer Security (TLS)/Secure Sockets Layer (SSL). Transparently encrypting and decrypting communications at their end points (e.g., client agent 152 and destination agent 154), for example, creates encrypted channels for securely transmitting one or more network communications. The certificate and keys used to transparently encrypt and/or decrypt one or more communications at their end points may also be transparently generated and disseminated to the end points. For example, the certificates and keys may be frequently rotated (e.g., every few minutes) to mitigate a risk for credential leakage.

Operations may be implemented, for example, entirely at the operating system kernel layer as a kernel module. The control system 200 may intercept socket and read/write operations that a networked service uses to communicate, either within a host or across a network. The control system 200 detects when a networked service requests or accepts new connections, e.g., by intercepting process calls to the Linux sys_connect( ) and sys_accept( ) system calls, and injects tokens on appropriate calls by the networked service to send/sendmsg/write etc. system calls. The control system 200 extracts and validates tokens on appropriate calls by the networked service to recv/recvmsg/read etc. system calls. The control system 200 intercepts and reads the data transmitted on these calls to determine if they correspond to the authorization policies and scopes covered by the authorization tokens used for the same connections.

When a networked service (e.g., client resource 122) initiates a connection to another networked service (e.g., destination resource 124), the control system 200 checks to see if the connection needs an enhanced authentication and authorization system. If so, the control system 200 allocates memory to use for the token injection, and may map this memory into the networked service's address space. When a networked service accepts a new connection, the control system 200 allocates memory for token reception/extraction, and may map this memory into the networked service's address space. More generally, networked services may share connections (sockets) and pass them around on to child networked services or even other networked services on the same host. In that case, the control system 200 ensures that the memory it allocates is mapped into the address space of each such other networked service that ends up sending or receiving data using the connection (socket). In some cases, the other networked services share address space, in which case the control system 200 may improve the procedure by sharing the memory mapping, avoiding a redundant operation.

To inject a token on an existing connection, the control system 200 adds hooks to functions in the kernel that are called when a process tries to send data. The networked service presents arguments to the kernel to indicate one or more buffers containing data to be transmitted, and the length of the data. The control system 200 modifies these arguments to prepend an additional buffer that contains the token, and also modifies the length argument by adding the length of the token data. When the kernel completes the system call, the control system 200 examines the result. If the operation was successful, then the control system 200 may change the return value to the networked service to indicate the amount of data, minus the token, that was successfully sent. By virtualizing both the arguments and return value of the system call, the token is injected without affecting the calling process.

To extract a token on an existing connection, the control system 200 adds hooks to kernel functions that are called when a networked service tries to receive data. The networked service presents arguments to the kernel to indicate one or more empty buffers that the kernel should populate with incoming data, and the amount of data to try to receive.

The networked service modifies these arguments to prepend a buffer large enough to store an incoming token, and modifies the length argument by adding the length of the expected token data. When the kernel completes the system call, the control system 200 determines if a valid token was received. If so, then the control system 200 may decrypt and use the token for subsequent authorization checks. If not, the control system 200 may block the connection, preventing data from being received by the networked service. Finally, the control system 200 may change the return value to the networked service to indicate the amount of data, minus the token, that was successfully written to the user buffers.

The control system 200 intercepts all data received at the destination service on validated connections with valid tokens, and may parse the application protocol requests sent by the client service. Any request that is not within the scope of the authorization token associated with the communication can be blocked by the control system 200. Optionally, the control system 200 may send an error response back to the client service in such cases.

Figure 6:
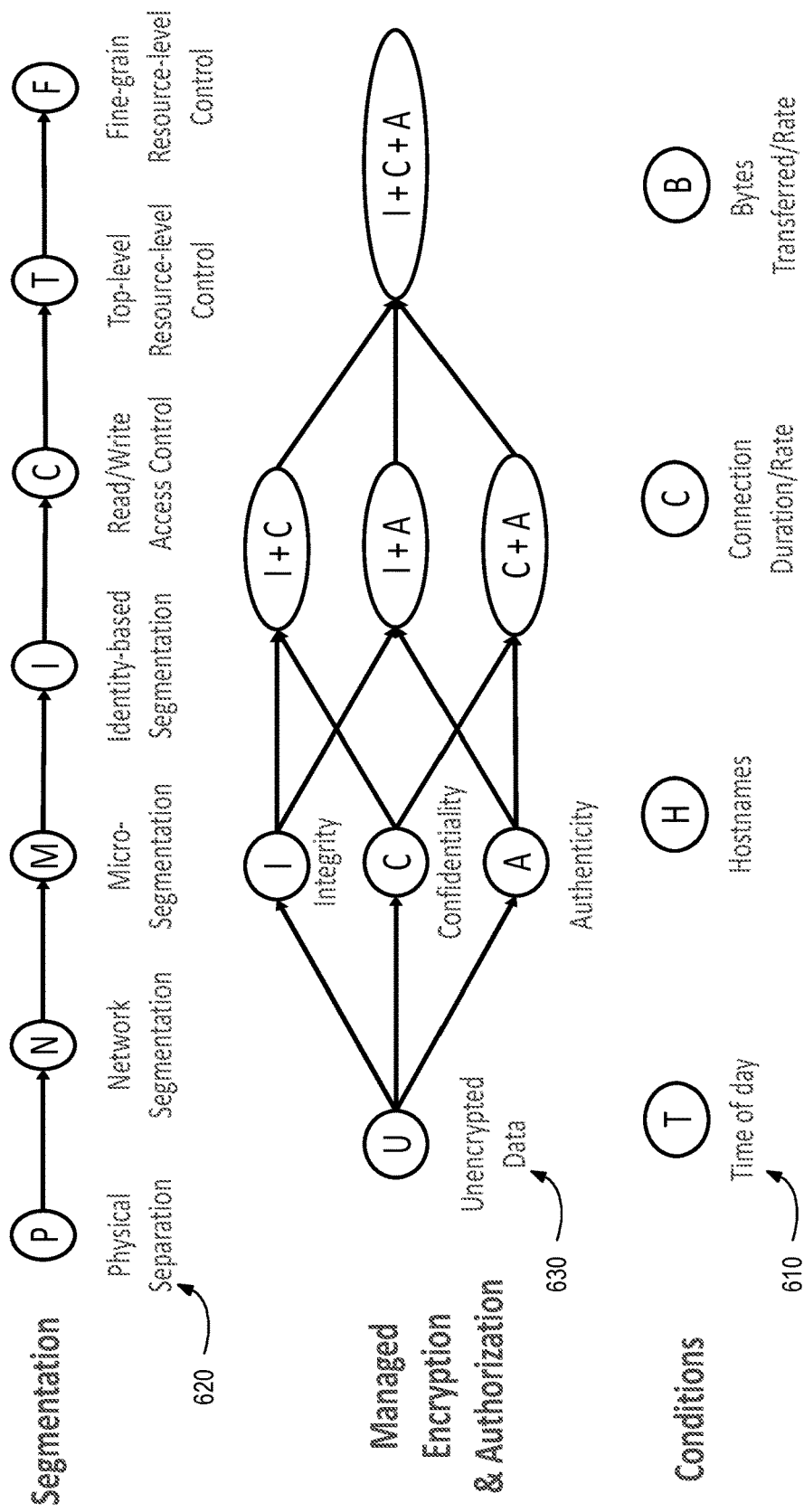
FIG. 6 is a block diagram illustrating an example map that may be used to identify a desired data path for a communication between a plurality of networked services in an environment, such as the environment shown in FIG. 1.

FIG. 6 shows various factors that may be considered when identifying a desired data path for a network communication. Given a set of conditions 610, and depending on a level of segmentation 620 between the sender (e.g., client resource 122, client agent 152) and the recipient (e.g., destination resource 124, destination agent 154) and a level of encryption and authorization 630 in accordance with the security policies 142 associated with the sender and the recipient, a security layer may be programmed to identify an appropriate or desired data path. The security layer integrates or brings together network security, where every micro-second matters, and application security, which operates in millisecond granularity, in one layer.

Example conditions 610 include a time of day (T), host names (H), a connection duration and/or rate (C), bytes transferred and/or transfer rate (B), and the like. Example segmentation levels 620 include physical separation (S), network segmentation (N), micro-segmentation (M), identity-based segmentation (I), read/write access control segmentation (C), top-level resource create/read/update/delete-based access control segmentation (T), fine-grain resource create/read/update/delete-based access control segmentation (F), and the like. Example encryption and authentication levels 630 include various combinations of integrity (I), confidentiality (C), and authenticity (A), including none of integrity, confidentiality, or authenticity, unencrypted (U).

For example, if the desired data path requires a transport layer security (TLS) encryption of the entire connection, then the client agent 152 may transparently direct the network communication through a user-level proxy process on both ends to perform TLS processing. If the desired data path requires only token injection and validation, then the client agent 152 may direct the network communication through a more-efficient kernel interception instead of a less-efficient data path through proxy processes. If the desired data path requires no enhancement, then the client agent 152 may direct the network communication directly without interception.

Examples of the disclosure transparently provided enhanced capabilities without requiring any changes to client or destination services, for example by binding to the operating system layer, and automatically understanding the application-layer protocols the networked services use. Data may be injected into the TCP stream, for example, without the knowledge of the application. Additionally, the encryption system described herein provides confidentiality, integrity, authenticity, and non-repudiation.

Moreover, examples of the disclosure provide a centralized resource-level visibility and control. Depending on a desired level of authorization (reachability vs. resource and create/read/update/delete-level), an appropriate data path may be selected for security and performance The data path may be, for example, a typical kernel path or a user-level proxy vs. hybrid may be used. Examples described herein may operate, for example, at layers 5 and 6 of the OSI model, between the transport and application layers.

Although described in connection with an example computing system environment, examples of the disclosure are capable of implementation with numerous other general purpose or special purpose computing system environments, configurations, or devices. Examples of well-known computing systems, environments, and/or configurations that may be suitable for use with aspects of the disclosure include, but are not limited to, mobile devices, tablets, laptop computers, desktop computers, server computers, microprocessor-based systems, multiprocessor systems, programmable consumer electronics, communication devices in wearable or accessory form factors, portable media players, gaming consoles, set top boxes, kiosks, tabletop devices, industrial control devices, minicomputers, mainframe computers, network computers, distributed computing environments that include any of the above systems or devices, and the like.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In some embodiments, the operations illustrated in the drawings may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

The embodiments illustrated and described herein as well as embodiments not specifically described herein but within the scope of aspects of the disclosure constitute example means for facilitating communication between a plurality of networked services. For example, the elements illustrated in FIGS. 1, 2, 4, and 5, such as when programmed, encoded, or configured to perform the operations illustrated in FIG. 3, constitute at least an example means for identifying a first service (e.g., controller 130, client agent 152, client component 420, hub component 440); generating a registration request associated with the first service (e.g., client agent 152, client component 420); deploying a first agent associated with the first service (e.g., controller 130, hub component 440); receiving one or more tokens associated with the first service (e.g., controller 130, client agent 152, destination agent 154, client component 420, destination component 430); identifying a communication transmitted from the first service and directed to a second service (e.g., client agent 152, destination agent 154, client component 420, destination component 430); determining whether the communication includes a network request (e.g., client agent 152, client component 420); transparently injecting the tokens into the communication (e.g., client agent 152, client component 420); and/or automatically transmitting the communication to the second service in accordance with one or more security policies associated with the one second service (e.g., client agent 152, client component 420).

When introducing elements of aspects of the disclosure or the embodiments thereof, the articles "a," "an," "the," and "said" are intended to mean that there are one or more of the elements. Furthermore, references to an "embodiment" or "example" of the present disclosure are not intended to be interpreted as excluding the existence of additional embodiments or examples that also incorporate the recited features. The terms "comprising," "including," and "having" are intended to be inclusive and mean that there may be additional elements other than the listed elements. The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, systems, and methods without departing from the scope of aspects of the disclosure, it is intended that all matter contained in the above description and shown in the accompanying drawings shall be interpreted as illustrative and not in a limiting sense.

While the aspects of the disclosure have been described in terms of various examples with their associated operations, a person skilled in the art would appreciate that a combination of operations from any number of different examples is also within the scope of the aspects of the disclosure.

What is claimed is:

1. A computer-implemented method for facilitating communication between a plurality of networked services, the method comprising
    identifying, at a first host system, a first service of the plurality of networked services;
    deploying, to the first host system, a first agent associated with the first service, the first agent including one or more identity tokens associated with the first service and one or more access tokens associated with a second service of the plurality of networked services;
    identifying, at the first agent, a communication transmitted from the first service and directed to the second service;
    determining whether the communication includes a network request; and
    on condition that the communication includes the network request, transparently injecting the one or more identity tokens into the communication for use in authenticating and authorizing the first service, and automatically transmitting the communication to the second service in accordance with one or more security policies associated with the one or more access tokens.

2. The computer-implemented method of claim 1, wherein identifying the first service of the plurality of networked services comprises identifying the first service using a fingerprint of the first host system, and further comprising:
    assigning the first service with a unique identifier; and
    classifying the first service into one or more type groups.

3. The computer-implemented method of claim 1 further comprising detecting the first service running at the first host system by identifying one or more application layer protocols used by the first service, wherein transparently injecting the one or more identity tokens comprises injecting the one or more identity tokens independent of the one or more application layer protocols.

4. The computer-implemented method of claim 1 further comprising removing, at the first agent, one or more credentials associated with the first service from the network request.

5. The computer-implemented method of claim 1 further comprising:
    determining, at a second agent associated with the second service, whether the one or more identity tokens satisfy a predetermined security threshold;
    on condition that the predetermined security threshold is satisfied, validating the one or more identity tokens, and forwarding the network request to the second service; and
    on condition that the predetermined security threshold is not satisfied, blocking the communication from being transmitted to the second service.

6. The computer-implemented method of claim 1 further comprising:
    encrypting, at the first agent, the communication for transmission to a second agent associated with the second service through an encrypted channel;
    decrypting, at the second agent, the communication;
    extracting, at the second agent, the one or more identity tokens from the communication; and
    cryptographically validating, at the second service, the one or more identity tokens.

7. The computer-implemented method of claim 1 further comprising tracking the communication using the one or more identity tokens.

8. The computer-implemented method of claim 1 further comprising:
    determining whether at least one token of the one or more identity tokens or the one or more access tokens is expired; and
    on condition that the at least one token is expired, refreshing the at least one token.

9. A system for facilitating communication between a plurality of networked services, the system comprising:
    a client agent associated with a first service of the plurality of networked services, the client agent comprising an injection mechanism configured to intercept a network request issued by the first service for a second service of the plurality of networked services, transparently inject one or more identity tokens into the network request while the network request is in transit to the second service, and automatically transmitting the network request to the second service in accordance with one or more security policies associated with the second service; and a destination agent associated with the second service, the destination agent comprising an interception mechanism configured to intercept the network request issued by the first service, extract the one or more identity tokens from the network request, determine whether the one or more identity tokens satisfy a predetermined destination security threshold, and, on condition that the predetermined destination security threshold is satisfied, forward the network request to the second service.

10. The system of claim 9, wherein the client agent is configured to identify the first service using a fingerprint of a host system associated with the client agent, and further comprising a controller comprising a service identity platform configured to assign the first service with a unique identifier, and classify the first service into one or more type groups.

11. The system of claim 9 further comprising a controller configured to retrieve the one or more security policies, generate one or more access tokens using the one or more security policies, and transmit the one or more access tokens to the client agent.

12. The system of claim 9, wherein the client agent is configured to detect the first service running at a host system associated with the client agent by identifying one or more application layer protocols used by the first service, and inject the one or more identity tokens independent of the one or more application layer protocols.

13. The system of claim 9, wherein the client agent is configured to remove one or more credentials associated with the first service from the network request.

14. The system of claim 9, wherein the client agent is configured to transparently encrypt the network request while the network request is in the transit to the second service such that the network request is transmitted through an encrypted channel, and the destination agent is configured to decrypt the network request.

15. The system of claim 9, wherein the destination agent is configured to extract the one or more identity tokens from the network request, and cryptographically validate the one or more identity tokens.

16. The system of claim 9, wherein the destination agent is configured to block the network request from being transmitted to the second service and generate an error response for transmission to the first service on condition that the predetermined destination security threshold is not satisfied.

17. The system of claim 9 further comprising a controller, wherein the destination client is configured to communicate with the controller to obtain one or more security policies associated with the first service.

18. The system of claim 9, wherein the client agent is configured to track the network request using the one or more identity tokens.

19. The system of claim 9, wherein the client agent is configured to determine whether at least one token of the one or more identity tokens is expired, and, on condition that the at least one token is expired, generate a request for refreshing the at least one token.

20. A computing system for facilitating communication between a plurality of networked services, the computing system comprising:
a memory device storing data associated with at least a first service of the plurality of networked services, and computer-executable instructions; and
a processor configured to execute the computer-executable instructions to:
identify, at the computing system, the first service of the plurality of networked services;
generate, for transmission to a controller, a registration request associated with the identified first service for use in registering the first service with the controller;
receive, from the controller, one or more identity tokens associated with the first service and one or more access tokens associated with a second service of the plurality of networked services;
identify a communication transmitted from the first service and directed to the second service of the plurality of networked services;
determine whether the communication includes a network request; and
on condition that the communication includes the network request, transparently inject the one or more identity tokens into the communication for use in authenticating and authorizing the first service, and automatically transmitting the communication to the second service in accordance with one or more security policies associated with the one or more access tokens.

* * * * *